United States Patent

Karube

[11] Patent Number: 4,802,184
[45] Date of Patent: Jan. 31, 1989

[54] HIGH FREQUENCY DISCHARGE EXCITED COAXIAL TYPE $CO_2$ LASER

[75] Inventor: Norio Karube, Machida, Japan
[73] Assignee: Fanuc Ltd, Minamitsuru, Japan
[21] Appl. No.: 112,565
[22] PCT Filed: Jan. 28, 1987
[86] PCT No.: PCT/JP87/00060
§ 371 Date: Sep. 28, 1987
§ 102(e) Date: Sep. 28, 1987
[87] PCT Pub. No.: WO87/04869
PCT Pub. Date: Aug. 13, 1987

[30] Foreign Application Priority Data

Jan. 29, 1986 [JP] Japan .................. 61-15595

[51] Int. Cl.[4] .................. H01S 3/097; H01S 3/03
[52] U.S. Cl. .................. 372/82; 372/55; 372/56; 372/58; 372/61
[58] Field of Search .................. 372/82, 61, 55, 56, 372/58

[56] References Cited
U.S. PATENT DOCUMENTS 3,386,043  5/1968  Marcatill et al. .
3,427,567  2/1969  Bridges et al. .................. 372/82

FOREIGN PATENT DOCUMENTS 138976   10/1981  Japan .
0138976  10/1981  Japan .................. 372/61
0003170  1/1985   Japan .
0142783  6/1986   Japan .
0280689  11/1986  Japan .
0294882  12/1986  Japan .
0295681  12/1986  Japan .

*Primary Examiner*—William L. Sikes
*Assistant Examiner*—Georgia Y. Epps
*Attorney, Agent, or Firm*—Staas & Halsey

[57] ABSTRACT

A high frequency discharge excited coaxial type $CO_2$ laser is provided, which has both the advantageous characteristic of high frequency excitation type, namely, small size and high efficiency, and the advantageous characteristic of coaxial type, namely, high quality beam mode. This laser includes a dielectric laser tube and two helical electric conductors of the same pitch, and a high frequency voltage is applied between the conductors by a high frequency power source while the $CO_2$ laser gas is passed axially in the laser tube.

7 Claims, 1 Drawing Sheet

HIGH FREQUENCY DISCHARGE EXCITED COAXIAL TYPE $CO_2$ LASER

TECHNICAL FIELD

The present invention relates to a coaxial type $CO_2$ laser which is adapted to be excited upon application of high frequency.

BACKGROUND OF THE INVENTION

A high frequency discharge excited $CO_2$ laser has the following features:

(i) metallic electrodes and carbon dioxide gas ($CO_2$) are not in contact with each other, so that no chemical reaction takes place therebetween;

(ii) being of capacitive ballast type, the laser has a high energy efficiency; and (iii) since transverse electric discharge requires relatively low voltage, employment of a power source composed of a solid state device will do, so that the size of the equipment can be reduced.

For these reasons, the high frequency discharge excited $CO_2$ laser can compose an oscillator which is (i) small in size, and
(ii) high in efficiency.

However, transverse electric discharge is generaly used in the case of high frequency discharge excited and the resulting gain distribution over the cross section of laser tube does not have the circular symmetry. Accordingly, a high frequency discharge excited laser is used in combination with the transverse gas flow whose gain distribution similarly is not circular symmetry, wherefore a good beam mode is not to be expected. For this reason, a DC discharge excited coaxial type $CO_2$ laser is used exclusively in the applications where good beam mode is a requirement. However, in respects other than beam mode, the DC discharge excited coaxial type laser is inferior to a high frequency discharge excited type laser.

SUMMARY OF THE INVENTION

It is an object of the present invention to provide a high frequency discharge excited coaxial type $CO_2$ laser, which eliminates the disadvantages of the known art, and combines the advantages of a high frequency discharge excited type laser and those of a coaxial type laser, and therefore is able to produce a good beam mode.

In order to achieve the above-mentioned object, the present invention comprises a laser tube composed of a dielectric material. A $CO_2$ laser gas is passed in the laser tube axially of the latter. Two helical electric conductors of the same pitch are affixed to the periphery of the laser tube, and a high frequency voltage is applied between the two helical electric conductors by means of a high frequency power source.

As described above, according to the present invention, the two helical electric conductors are affixed to the periphery of the laser tube composed of a dielectric material, and the high frequency voltage is applied between the two helical electric conductors by means of the high frequency power source to cause electric discharge between the two helical electric conductors in the laser tube; wherefore owing to the fact that the $CO_2$ gas stream flowing in the laser tube possesses circular symmetry with respect to the axis of the laser tube, and the fact that the electric discharge occurs in a manner that it traces a helical locus gradually proceeding along and rotating about the axis of the laser tube because of the provision of the helical electric conductors, and hence the mode of the electric discharge becomes, as a whole, circular symmetry, it is possible to obtain the good beam mode which is proper to the coaxial type laser, without sacrificing the advantages of the high frequency discharge excited such as no chemical reaction taking place between the electrodes and the $CO_2$ gas, high energy efficiency, utilization of a power source composed of a solid state device, and as a result $CO_2$ laser for cutting can be made smaller in size and higher in efficiency.

BEST MODE OF CARRYING OUT THE INVENTION

Figure 1:
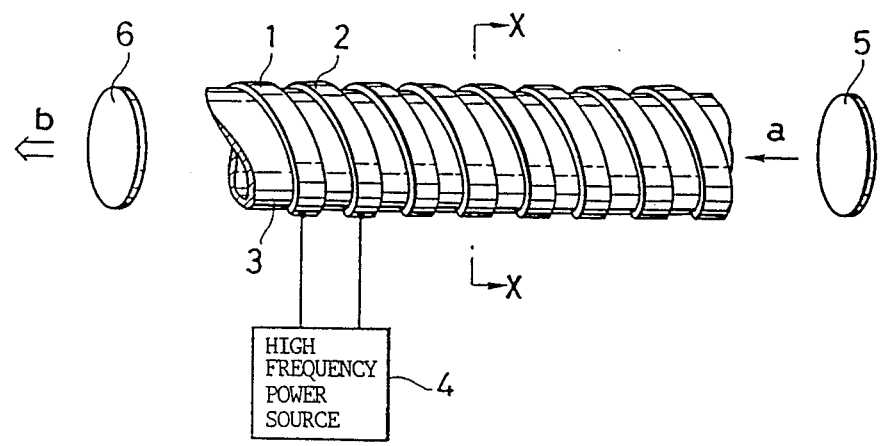
FIG. 1 is a view of an essential part of a high frequency discharge excited coaxial type laser according to an embodiment of the present invention.
Figure 2:
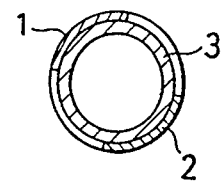
FIG. 2 is a cross-sectional view taken along line X—X of FIG. 1.

FIGS. 1 and 2 show the essential part of a high frequency discharge excited coaxial type laser according to an embodiment of the present invention, wherein reference numeral 3 designates a laser tube of a dielectric pipe having a circular cross section as shown in FIG. 2. The $CO_2$ laser gas is passed axially in the laser tube 3. Applied helically on the periphery of the laser tube are two stripes of conductive paint such as aquadag, which form helical films as electric conductors 1, 2 having the same pitch and a phase difference of 180°; a high frequency voltage from a high frequency power source 4 is applied between the two conductors 1, 2. Reference numerals 5 and 6 refer to a total reflection mirror and an output coupling mirror, respectively.

In the laser thus constructed, the $CO_2$ laser gas is passed in the laser tube 3 in the direction indicated by an arrow a in FIG. 1, and the high frequency voltage is applied between the two helical conductors 1 and 2 by the high frequency power source 4, whereby in the laser tube 3 electric discharge occurs between the diametrically opposite faces of the conductors 1 and 2 which oppose each other across the dielectric layer of the laser tube 3. This electric discharge develops in a manner that it traces a helical locus gradually proceeding along and rotating around the axis of the tube, because of the helical arrangement of the two conductors 1, 2. Therefore, the electric discharge occurs, as a whole, in circular symmetry with respect to the axis of the tube. The $CO_2$ gas stream, the distribution of which affects the gain distribution and hence the electric discharge mode formation, flows along the axis of the laser tube 3 whose cross section is circular so that, cross-sectionally viewed, the gas stream roughly adopts a circular symmetry.

Consequently, the laser gain adopts a circular symmetry to a great extent and therefore the laser beam b, which is emitted from the laser tube 3 via the output coupling mirror 6, assumes a circular mode, and as a result, the good beam mode proper to a coaxial type laser is obtained.

In view of dielectric breakdown strength, appropriate dielectric materials for the laser tube 3 include barium titanate, quartz, alumina, Mylar, and polyimide. A ceramic tube made of these materials can constitute a desirous laser tube 3.

Let D be the thickness of the laser tube 3, V the discharge sustaining voltage, $\epsilon$ the dielectric constant, $\omega$ the frequency of the high frequency power source, and I the current density, then the voltage drop through the two dielectric layers of the laser tube 3 is given by $Id/\epsilon\omega$. In order to secure stable electric discharge, the value $Id/\epsilon\omega$ should be equal to the discharge sustaining voltage V of the laser plasma, and hence the appropriate thickness D is given as follows:

$$D = V\epsilon\omega/2I$$

Therefore, by using a dielectric tube of larger dielectric constant $\omega$ and/or increasing the frequency of the high frequency power source, it becomes possible to make the thickness D of the dielectric tube greater, so that no pinholes or the like are formed in the course of manufacturing, wherefore the dielectric mechanical strength.

Thus, if the conductors 1, 2 are formed of thin film, the conductors 1, 2 do not peel off the dielectric body 3, even if the conductors 1, 2 differ substantially from the dielectric body 3 in thermal characteristics such as thermal expansion coefficient, so that it is possible to select a material for the dielectric body 3 purely from the viewpoint of electrical properties and regardless of the thermal properties.

Incidentally, in the above embodiment, the film conductors 1, 2 are formed by applying a conductive paint, but may be formed of copper or gold applied by fused metal injection. Other methods like plating and evaporation may be used.

I claim:

1. A high frequency discharge excited coaxial type $CO_2$ laser, comprising:
    a laser tube composed of a dielectric material, in which a $CO_2$ laser gas is passed in an axial direction through said tube;
    two helical electric conductors affixed to an outer periphery of said laser tube, said conductors having the same pitch and being films of conductive material, said conductors each having a thickness which is small enough to prevent said conductors from peeling off said laser tube when said conductors and said dielectric material have different thermal properties; and
    a high frequency power source for applying a high frequency voltage between said two helical electric conductors, the thickness of said laser tube being equal to the value defined as $D = V\beta/2I$, wherein
    D is the thickness of said laser tube
    V is the discharge sustaining voltage
    $\epsilon$ is the dielectric constant of said laser tube
    $\omega$ is the frequency of said high frequency power source, and
    I is the current density.

2. A high frequency discharge excited coaxial type $CO_2$ laser as claimed in claim 1, wherein said two helical electric conductors are arranged such that a phase difference of 180° exists therebetween.

3. A high frequency discharge excited coaxial type $CO_2$ laser as claimed in claim 1, wherein said laser tube is circular in cross section.

4. A high frequency discharge excited coaxial type $CO_2$ laser as claimed in claim 1, wherein said electric conductors are conductive paint applied as films to the outer periphery of said laser tube.

5. A high frequency discharge excited coaxial type $CO_2$ laser as claimed in claim 1, wherein the two conductors have diametrically opposite faces opposing each other, and wherein electric discharge occurs between the diametrically opposite faces.

6. A high frequency discharge excited coaxial type $CO_2$ laser as claimed in claim 1, wherein said dielectric material is composed of an element which is selected from a group consisting of barium titanate, quartz, alumina, Mylar, and polyimide.

7. A high frequency discharge excited coaxial type $CO_2$ laser as claimed in claim 1, wherein said laser tube has a thickness which is large enough to prevent pin holes from being formed during manufacturing and to provide said laser tube with required mechanical strength.

* * * * *